(12) United States Patent
Murphy-Chutorian et al.

(10) Patent No.: US 9,311,530 B1
(45) Date of Patent: *Apr. 12, 2016

(54) SUMMARIZING A PHOTO ALBUM IN A SOCIAL NETWORK SYSTEM

(71) Applicant: Google Inc., Mountain View, CA (US)

(72) Inventors: Erik Murphy-Chutorian, Palo Alto, CA (US); Charles Joseph Rosenberg, Cupertino, CA (US); Shengyang Dai, San Jose, CA (US); Ehud Rivlin, Palo Alto, CA (US); Mei Han, Palo Alto, CA (US); Kyle Heath, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,339

(22) Filed: Oct. 21, 2014

Related U.S. Application Data

(63) Continuation of application No. 13/489,407, filed on Jun. 5, 2012, now Pat. No. 8,891,883.

(60) Provisional application No. 61/647,199, filed on May 15, 2012.

(51) Int. Cl.
*G06K 9/62* (2006.01)
*G06K 9/00* (2006.01)

(52) U.S. Cl.
CPC .......... *G06K 9/00456* (2013.01); *G06K 9/6267* (2013.01); *G06K 9/62* (2013.01)

(58) Field of Classification Search
CPC ................ G06K 9/00677; G06K 9/62; G06K 2009/00328; G06K 9/00221; G06K 9/036; G06K 9/00; G06K 9/00892; G06F 17/30; G06F 17/30244; G06F 17/30247; G06F 17/30256; G06F 21/34; H04N 5/23222; H04N 1/00196; H04N 7/183; G06T 2207/30168; G06T 7/0002; A63F 13/12; A63F 2300/61; G06Q 20/3274
USPC ......... 382/115, 118, 222, 224, 225, 228, 282, 382/305; 707/723, 737, 749, 772, 802
See application file for complete search history.

(56) References Cited

U.S. PATENT DOCUMENTS 6,396,963 B2   5/2002   Shaffer et al.
6,742,809 B2   6/2004   Frosig et al.
(Continued)

FOREIGN PATENT DOCUMENTS

EP    2312462      4/2011
EP    2443569      4/2012
WO    2011015401   12/2011

OTHER PUBLICATIONS

International Search Report and Written Opinion for related PCT Application No. PCT/US2015/037231, Aug. 24, 2015, 11 pages.
(Continued)

*Primary Examiner* — Vu Le
*Assistant Examiner* — Aklilu Woldemariam

(57) ABSTRACT

Embodiments generally relate to summarizing a photo album in a social network system. In one embodiment, a method includes grouping photos into a plurality of groups of photos, and selecting a plurality of representative photos, where each representative photo represents a respective group from the plurality of groups, where the selecting is based on a quality score of each of the photos, and where each quality score is based on different types of attributes. The method also includes enabling the plurality of representative photos to be shared.

19 Claims, 5 Drawing Sheets

(56) References Cited

U.S. PATENT DOCUMENTS

| | | | |
|---|---|---|---|
| 6,847,733 B2 | 1/2005 | Savakis et al. | |
| 7,148,990 B2 | 12/2006 | Atkins | |
| 7,403,642 B2 | 7/2008 | Zhang et al. | |
| 7,467,222 B2 | 12/2008 | Kacker | |
| 7,508,961 B2 | 3/2009 | Chen et al. | |
| 7,519,200 B2 | 4/2009 | Gokturk et al. | |
| 7,587,070 B2 | 9/2009 | Myers | |
| 7,737,995 B2 | 6/2010 | Vronay | |
| 7,809,197 B2 | 10/2010 | Fedorovskaya et al. | |
| 7,856,380 B1 | 12/2010 | Latin-Stoermer et al. | |
| 7,860,319 B2 | 12/2010 | Obrador et al. | |
| 7,869,658 B2 | 1/2011 | Blose et al. | |
| 7,929,733 B1 | 4/2011 | Lehnert et al. | |
| 8,031,914 B2 | 10/2011 | Zhang et al. | |
| 8,189,880 B2* | 5/2012 | Wen | G06F 17/30259 382/118 |
| 8,352,465 B1* | 1/2013 | Jing | G06F 17/30867 707/723 |
| 8,352,494 B1 | 1/2013 | Badoiu | |
| 8,438,163 B1* | 5/2013 | Li | G06F 17/3028 382/159 |
| 8,566,331 B1* | 10/2013 | Covell | G06F 17/30265 707/749 |
| 8,571,331 B2 | 10/2013 | Cifarelli | |
| 8,626,699 B2* | 1/2014 | Xie | G06N 5/02 706/58 |
| 8,660,358 B1 | 2/2014 | Bergboer et al. | |
| 8,724,910 B1 | 5/2014 | Pillai et al. | |
| 8,891,883 B2 | 11/2014 | Murphy-Chutorian et al. | |
| 8,983,193 B1* | 3/2015 | Ordonez Roman | G06K 9/6263 382/118 |
| 2001/0046330 A1 | 11/2001 | Shaffer et al. | |
| 2002/0191861 A1 | 12/2002 | Cheatle | |
| 2004/0161224 A1 | 8/2004 | Yamazoe | |
| 2006/0020597 A1 | 1/2006 | Keating et al. | |
| 2006/0129555 A1 | 6/2006 | Burdick et al. | |
| 2006/0153460 A1* | 7/2006 | Kim | G06F 17/30256 382/225 |
| 2006/0198559 A1 | 9/2006 | Manico et al. | |
| 2006/0200475 A1 | 9/2006 | Das et al. | |
| 2006/0251338 A1 | 11/2006 | Gokturk | |
| 2007/0177805 A1 | 8/2007 | Gallagher | |
| 2008/0094420 A1 | 4/2008 | Geigel et al. | |
| 2008/0152201 A1 | 6/2008 | Zhang et al. | |
| 2008/0167102 A1 | 7/2008 | Diakpoulos et al. | |
| 2008/0212851 A1 | 9/2008 | Ray | |
| 2008/0267458 A1* | 10/2008 | Laganiere | G06K 9/00221 382/118 |
| 2008/0298766 A1* | 12/2008 | Wen | G06F 17/30259 386/282 |
| 2009/0034805 A1 | 2/2009 | Perlmutter | |
| 2009/0113350 A1 | 4/2009 | Hibino et al. | |
| 2009/0252383 A1 | 10/2009 | Adam et al. | |
| 2009/0299999 A1 | 12/2009 | Loui et al. | |
| 2009/0300473 A1 | 12/2009 | Adams | |
| 2010/0235400 A1 | 9/2010 | Myers et al. | |
| 2010/0303342 A1 | 12/2010 | Berg et al. | |
| 2010/0315522 A1 | 12/2010 | Tsurumi | |
| 2011/0194761 A1* | 8/2011 | Wang | G06F 17/30247 382/165 |
| 2011/0264641 A1 | 10/2011 | Yang et al. | |
| 2012/0106859 A1 | 5/2012 | Cheatle | |
| 2012/0155765 A1 | 6/2012 | Joshi et al. | |
| 2012/0275714 A1 | 11/2012 | Gao | |
| 2013/0101220 A1 | 4/2013 | Bosworth et al. | |
| 2013/0148864 A1 | 6/2013 | Dolson et al. | |
| 2013/0190600 A1* | 7/2013 | Gupta | A61B 8/0866 600/410 |
| 2013/0215275 A1* | 8/2013 | Berini | G06F 21/32 348/150 |
| 2013/0273968 A1* | 10/2013 | Rhoads | G06F 17/30244 455/556.1 |
| 2014/0153832 A1 | 6/2014 | Kwatra | |

OTHER PUBLICATIONS

First Action Interview—Office Action dated Sep. 2, 2014; issued in corresponding U.S. Appl. No. 13/894,341.

Notice of Allowance dated Jul. 10, 2014, issued in corresponding U.S. Appl. No. 13/489,407; 13 pages.

San Pedro, Jose et al. "Ranking and Classifying Attractiveness of Photos in Folksononnies." WWW 2009. Session: Photos and Web 2.0. Apr. 20-24, 2009. pp. 771-780.

Trevisiol, Michele et al. "Image Ranking Based on User Browsing Behavior." SIGIR '12. Aug. 12-16, 2012. pp. 445-454.

"Photographer and Image Ranking Explained." pixabay. www.pixabay.com. May 29, 2012. 4 pages.

San Pedro, Jose et al. "Leveraging User Comments for Aesthetic Aware Image Search Reranking." WWW 2012. Session: Obtaining and Leveraging User Comments. Apr. 16-20, 2012. pp. 439-448.

USPTO. Non-final Office Action for Related U.S. Appl. No. 13/489,407. Feb. 27, 2014. 15 pages.

USPTO. First Action Interview, Pre-Interview Communication for Related U.S. Appl. No. 13/894,341. May 28, 2014. 4 pages.

Notice of Allowance dated Jan. 7, 2015 issued in corresponding U.S. Appl. No. 13/894,341.

International Bureau of WIPO, International Preliminary Report on Patentability for International Patent Application No. PCT/US2014/037895, Jan. 12, 2016, 7 pages.

USPTO, International Search Report for International Patent Application No. PCT/US2014/037895, Dec. 21, 2015, 2 pages.

USPTO, Written Opinion for International Patent Application No. PCT/US2014/037895, Dec. 21, 2015, 6 pages.

* cited by examiner

SUMMARIZING A PHOTO ALBUM IN A SOCIAL NETWORK SYSTEM

CROSS REFERENCE TO RELATED APPLICATION

This application claims priority to U.S. Provisional application Ser. No. 61/647,199 filed May 15, 2012, and to U.S. Nonprovisional application Ser. No. 13/489,407 filed Jun. 5, 2012, which are hereby incorporated by reference as if set forth in full in the application for all purposes.

TECHNICAL FIELD

Embodiments relate generally to social network systems, and more particularly to summarizing a photo album in a social network system.

BACKGROUND

Social network systems often enable users to upload photos and create photo albums that contain the uploaded photos. After a user uploads photos to a social network system, the social network system typically enables the user to create one or more photo albums. The user can then determine which photos to include in each of the photo albums. The social network system typically enables the user to share the photo album with other users of the social network system. For example, a user may allow other users to access and view photos in particular photo albums.

SUMMARY

Embodiments generally relate to summarizing a photo album in a social network system. In one embodiment, a method includes grouping photos into a plurality of groups of photos, and selecting a plurality of representative photos, where each representative photo represents a respective group from the plurality of groups, where the selecting is based on a quality score of each of the photos, and where each quality score is based on different types of attributes. The method also includes enabling the plurality of representative photos to be shared.

With further regard to the method, the photos are grouped based on one or more policies. In one embodiment, the photos are grouped such that the photos in a particular group are similar to each other. In one embodiment, the method further includes detecting visual elements in each of the photos, and grouping photos that have similar visual elements. In one embodiment, the method further includes merging a photo or group of photos with an existing group of photos if the photos in a resulting merged group are similar. In one embodiment, the selecting includes determining the quality score of each of the photos, and where the quality score of a particular photo is based on multiple attributes. In one embodiment, the selecting includes determining the quality score of each of the photos, where the quality score of a particular photo is based on multiple attributes, and where the attributes include one or more of faces of people and landmarks. In one embodiment, the selecting includes determining the quality score of each of the photos, where the quality score of a particular photo is based on multiple attributes, and where the attributes include cropping limitations. In one embodiment, the selecting includes determining attribute scores for each of the photos, and determining the quality score of each of the photos, where each quality score is based on the attribute scores. In one embodiment, the selecting of a particular representative photo is based on a ranking of quality scores.

In another embodiment, a method includes grouping photos into a plurality of groups of photos, where the photos are grouped such that the photos in a particular group are similar to each other. The grouping includes detecting visual elements in each of the photos; grouping photos that have similar visual elements; and merging a photo or group of photos with an existing group of photos if the photos in a resulting merged group are similar. The method also includes selecting a plurality of representative photos, where each representative photo represents a respective group from the plurality of groups, where the selecting includes determining a quality score of each of the photos, where each quality score is based on different types of attribute scores, where the attribute scores are based on attributes including one or more of faces of people, landmarks, and cropping limitations, and where the selecting of a particular representative photo is based on a ranking of quality scores. The method also includes enabling the plurality of representative photos to be shared.

In another embodiment, a system includes one or more processors, and logic encoded in one or more tangible media for execution by the one or more processors. When executed, the logic is operable to perform operations including: grouping photos into a plurality of groups of photos; selecting a plurality of representative photos, where each representative photo represents a respective group from the plurality of groups, where the selecting is based on a quality score of each of the photos, and where each quality score is based on different types of attributes; and enabling the plurality of representative photos to be shared.

With further regard to the system, the photos are grouped based on one or more policies. In one embodiment, the photos are grouped such that the photos in a particular group are similar to each other. In one embodiment, the logic when executed is further operable to perform operations including detecting visual elements in each of the photos, and grouping photos that have similar visual elements. In one embodiment, the logic when executed is further operable to perform operations including merging a photo or group of photos with an existing group of photos if the photos in a resulting merged group are similar. In one embodiment, the logic when executed is further operable to perform operations including determining the quality score of each of the photos, and where the quality score of a particular photo is based on multiple attributes. In one embodiment, the logic when executed is further operable to perform operations including determining the quality score of each of the photos, where the quality score of a particular photo is based on multiple attributes, and where the attributes include one or more of faces of people and landmarks. In one embodiment, the logic when executed is further operable to perform operations including determining the quality score of each of the photos, where the quality score of a particular photo is based on multiple attributes, and where the attributes include cropping limitations. In one embodiment, the logic when executed is further operable to perform operations including determining attribute scores for each of the photos, and determining the quality score of each of the photos, where each quality score is based on the attribute scores. In one embodiment, the selecting of a particular representative photo is based on a ranking of quality scores.

DETAILED DESCRIPTION

Embodiments described herein provide a summary of a photo album in a social network system. As described in more detail below, a system groups photos into groups of photos, where each group contains photos with content that is similar to each other, and where the photos contained in one group are different from the photos in other groups. For example, one group may include photos of the same person in each photo. Another group may include photos of the same group of people in each photo. Yet, another group may include landmarks. The system then selects one or more representative photos for each group, where each representative photo represents a respective group of photos. For example, the system may determine a particular photo of a person to be the best representative photo for a group of photos based on a quality score. As described in more detail below, the quality score may be based on a variety of attribute scores, which may reflect what other users are more likely to find appealing or interesting. For example, a particular photo may have a high quality score, because the photo shows a baby smiling. Another photo may have a lower quality score, because the photo is blurry and shows person who is not smiling. In various embodiments, the system may rank the photos against each other as a part of a process for selecting the best photos to represent various groups of photos. The system then enables the representative photos of each group to be shared. For example, the owner of the photo album may send a summary of the photo album to a friend, where the summary includes representative photos corresponding to a variety of diverse groups of photos. Each photo sent to the friend of the owner represents its respective and distinct group of photos within the owner's photo album.

Figure 1:
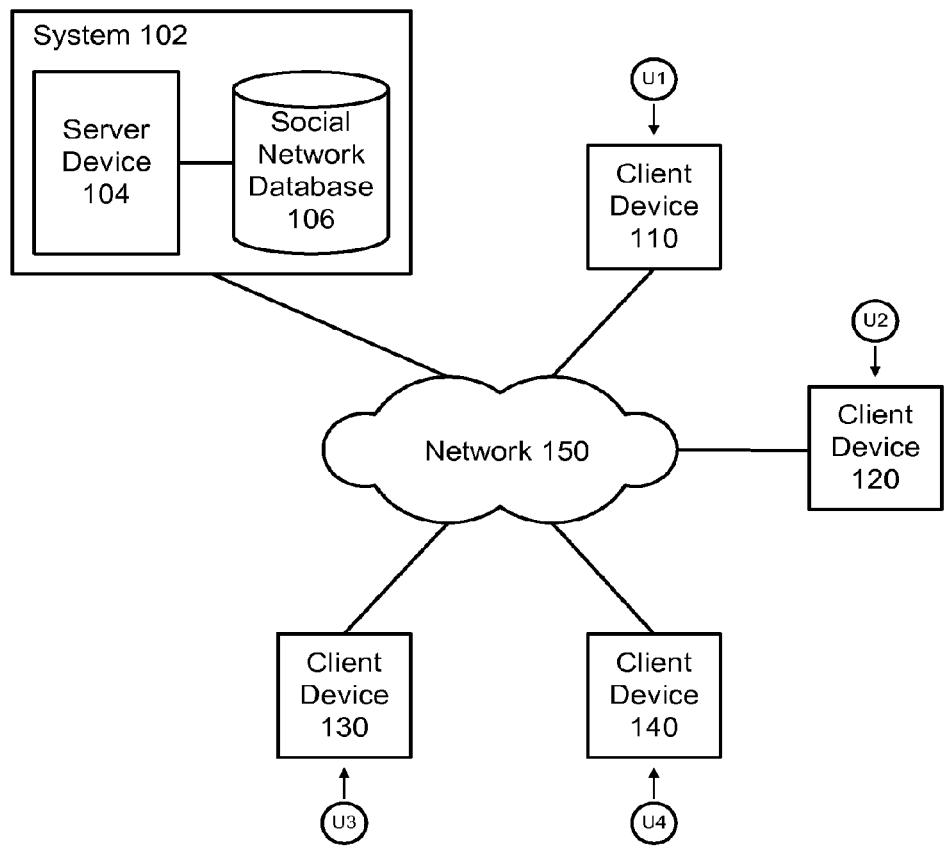
FIG. 1 illustrates a block diagram of an example network environment, which may be used to implement the embodiments described herein.

FIG. 1 illustrates a block diagram of an example network environment 100, which may be used to implement the embodiments described herein. In one embodiment, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein.

In various embodiments, users U1, U2, U3, and U4 may communicate with each other using respective client devices 110, 120, 130, and 140. For example, users U1, U2, U3, and U4 may share summaries of photo albums with each other via system 102.

Figure 2:
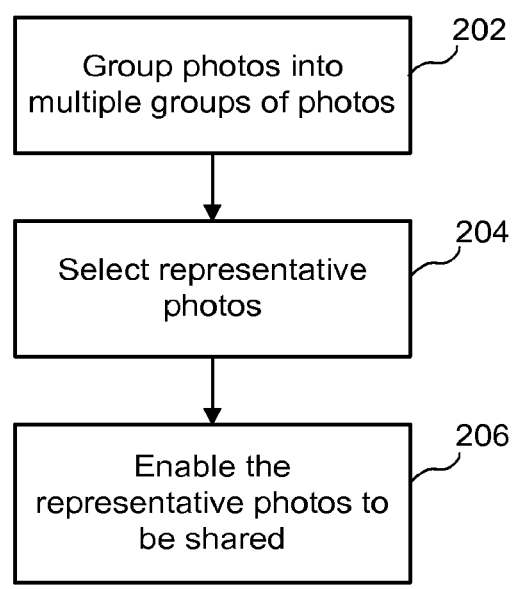
FIG. 2 illustrates an example simplified flow diagram for summarizing a photo album in a social network system, according to one embodiment.

FIG. 2 illustrates an example simplified flow diagram for summarizing a photo album in a social network system, according to one embodiment. Referring to both FIGS. 1 and 2, the method is initiated in block 202, where system 102 groups photos into multiple groups of photos. In one embodiment, system 102 groups the photos such that the photos in a particular group are similar to each other. In one embodiment, system 102 may obtain the photos from an existing photo album stored in social network database 106 or stored in any other suitable database.

A group or cluster of photos may be referred to as a burst. In various embodiments, a burst may be defined as a group of photos having very similar images. For example, such photos may be duplicates, near-duplicates, or simply photos of a similar subject (e.g., a person, a landmark, etc.) taken in temporal succession (e.g., within 15 minutes of each other, or any other predetermined time period).

In various embodiments, system 102 may group similar photos based on one or more policies, where the policies may be associated with different algorithms that determine the degree of similarity and/or degree of difference between two or more photos. For example, in one embodiment, system 102 may group photos of like subject matter together to create a number of groups, referred to as "diversity clusters," and system 102 may place the photos into the different groups by visual appearance, time, faces, image genre, etc.

System 102 associates photos with groups having similar photos. For example, in one embodiment, system 102 may determine two photos to be sufficiently similar to belong to the same group, because the two photos show the same person. In another example, system 102 may determine two photos to be sufficiently similar to belong to the same group, because the two photos show the same landmark. Example embodiments directed to various grouping policies and algorithms for grouping photos are described in more detail in connection to FIG. 3.

In block 204, system 102 selects representative photos, where each representative photo represents a respective group from the groups of photos. As such, the representative photos from each group of photos give a comprehensive summary of the photo album. For example, a group of photos of a particular person may include multiple photos (e.g., 5 photos) of that person. System 102 selects one photo to represent that group of photos. Similarly, a second group of photos of a particular landmark may include multiple photos (e.g., 10 photos) of that landmark. System 102 selects one photo to represent that group of photos.

In various embodiments, to select a representative photo for a given group, system 102 determines the quality of each of the photos. In various embodiments, the quality of a given photo is based on multiple attributes. For example, attributes may be associated with faces of people, landmarks, events, cropping limitations, general photo quality, etc. System 102 may determine an overall quality score for each photo, where the quality score is based on different types of attribute scores. Example embodiments directed to computing quality scores and attribute scores are described in more detail in connection to FIG. 4.

In block 206, system 102 enables the representative photos to be shared. In one embodiment, system 102 enables a user to send the representative photos to one or more other users (e.g., friends) of the social network system. In one embodiment, system 102 enables a user to post the representative photos in a social network stream. In one embodiment, system 102 may provide a link to a page with the photo album. If desired, users who view the representative photos may then access and view the photo album. System 102 enables the owner of the photo album to determine and select which other users may or may not view the photo album via the link. For example, system 102 may provide the owner of the photo album with a drop-down menu or field to enable the owner to select and/or enter names of users or groups of users who may access and view the photo album, or who may not access and view the photo album.

Figure 3:
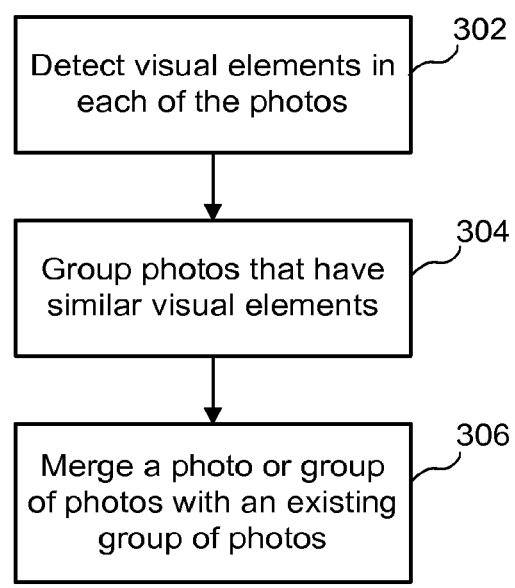
FIG. 3 illustrates an example simplified flow diagram for grouping photos of a photo album into multiple groups of photos, according to one embodiment.

FIG. 3 illustrates an example simplified flow diagram for grouping photos of a photo album into multiple groups of photos, according to one embodiment. Referring to both FIGS. 1 and 3, the method is initiated in block 302, where system 102 detects visual elements in each of the photos. Such elements may include faces of people, groups of people, landmarks, objects, etc.

In block 304, system 102 groups photos that have similar visual elements. For example, in one embodiment, one group may include photos of the same person. Another group may include photos of the same group of people. Another group may include the same landmark. Another group may include various landmarks. In one embodiment, system 102 separates photos that have different visual elements into separate groups. In other words, the photos contained in one group would be different from the photos in other groups. For example, in one embodiment, a group would generally not contain both photos of an individual and photos of a landmark. Example embodiments for grouping similar photos are described below.

In one embodiment, to group photos, system 102 compares a first photo to a second photo based on one or more similarity factors. In one embodiment, the similarity factors may include a visual distance between images, a time between the images, the number of faces, whether the same person is identified in photos. To clarify, visual distance refers to the degree of similarity between two images of objects in two different photos. For example, an image of a dog would be more visually distant from an image of a house than an image of a cat.

In one embodiment, system 102 may assign a value for each of these similarity factors. In one example embodiment, system 102 may assign a value that is proportional to the visual distance (i.e., distinctness) between images in two photos. For example, two photos showing two different types of animals (e.g., a bird and a dog) would have a higher value than two photos showing two different types of birds (e.g., a sparrow and a blue jay).

In another example embodiment, system 102 may assign a value that is proportional to the difference in the number of people in the two photos. For example, two photos showing different numbers of people (e.g., a group of two people and a group of three people) would have a higher value than two photos showing the same number of people. In one embodiment, the value would go down (e.g., weighted less) if the number of people in both photos goes up. For example, two photos showing different numbers of people, yet with few people (e.g., a group of two people and a group of three people), would have a higher value yet not much higher than two photos showing different numbers of people where the numbers are greater (e.g., a group of 19 people and a group of 20 people).

In another example embodiment, system 102 may assign a value that is proportional to the length of the time period between the capture of the two photos. For example, two photos taken during significantly different times (e.g., 6 hours apart, a day apart, etc.) would have a higher value than two photos taken at substantially the same time (e.g., within 1 minute, within the same hour, etc.).

In one embodiment, system 102 groups two given photos together in the same group if the total value for the two photos falls below a predetermined threshold. For example, if two photos are similar, their total value will be low such that system 102 will group them together. Conversely, if two photos are dissimilar, their total value will be high such that system 102 will group them separately.

In one embodiment, these various similarity factors may have different weights. For example, the value associated with the visual distance between images in two photos may have a higher weight than the value associated with the number of people of the photo. This is one example, and the actual weighting will depend on the specific implementation.

In block 306, system 102 merges a photo or group of photos with an existing group of photos if the photos in a resulting merged group are similar. For example, if system 102 combines to two similar photos into a first group, system 102 would include a third photo in that same group if the third photo is similar to the first two photos (e.g., based on values described above). System 102 would not include a fourth photo in that same first group if the fourth photo is different from the first three photos. Instead, system 102 would create second group for the fourth photo. If system 102 determines that photos in a third group were similar to the photos in the first group, system 102 would merge the first and third groups. In one embodiment, system 102 may merge photos or groups of photos with an existing group of photos as system 102 processes new photos or new groups of photos.

In various embodiments, system 102 may apply one or more constraint policies to the grouping of photos in order to prevent two groups from being merged if their photos were sufficiently different. In one embodiment, system 102 may apply a time constraint. For example, in one embodiment, system 102 would not group two groups of photos together if the length of time between when the photos were taken is greater than a predetermined time period (e.g., 30 minutes, 1 hour, 2 hours, 1 day, etc.). As such, if the photos in two different groups have similar photos but the photos were taken a day apart, system 102 would not merge the two groups.

In one embodiment, system 102 may apply various "person" constraints. For example, system 102 would not group photos showing people with photos that do not show people (e.g., landmarks or scenery only).

In another example, system 102 may determine if an individual shown in two different photos is the same person. For example, if the individual is the same person in the two photos, system 102 would group the photos in the same group. If the individual is not the same person in the two photos, system 102 would not group the photos in the same group. This could be a case, for example, where two brothers having similar yet different facial features are in two different photos. System 102 may include the two photos in two separate groups based on facial appearance differences.

In one embodiment, system 102 may detect photos of particular types of events in a photo album. For example, system 102 may identify particular visual features (e.g., wedding cake, bridal gown, etc.) and determine that the photos are associated with a particular type of event (e.g., wedding). In another example, system 102 may identify graduation caps and determine that the photos are associated with a graduation. In another example, system 102 may identify a beach and a resort hotel and determine that the photos are associated with a vacation. As such, system 102 would group photos that are categorized as particular special events. For example, at a wedding, system 102 may ensure that a group includes photos of the bride and groom. If there are multiple groups containing random individual people, system 102 may merge the groups into one group. This may be appropriate where a series of photos of different people are taken at a wedding party.

In various embodiments, system 102 may utilize a variety of recognition algorithms to recognize faces, landmarks, objects, etc. in photos. Such facial algorithms may be integral to system 102. System 102 may also access recognition algorithms provided by software that is external to system 102 and that system 102 accesses.

In various embodiments, system 102 enables users of the social network system to opt-in or opt-out of system 102 using their faces in photos or using their identity information in recognizing people identified in photos. For example, system 102 may provide users with multiple opt-in and/or opt-out selections. Different opt-in or opt-out selections could be associated with various aspects of facial recognition. For example, opt-in or opt-out selections may be associated with individual photos, all photos, individual photo albums, all photo albums, etc. The selections may be implemented in a variety of ways. For example, system 102 may cause buttons or check boxes to be displayed next to various selections. In one embodiment, system 102 enables users of the social network to opt-in or opt-out of system 102 using their photos for facial recognition in general. Specific example embodiments for recognizing faces, objects, and landmarks are described in detail below.

Figure 4:
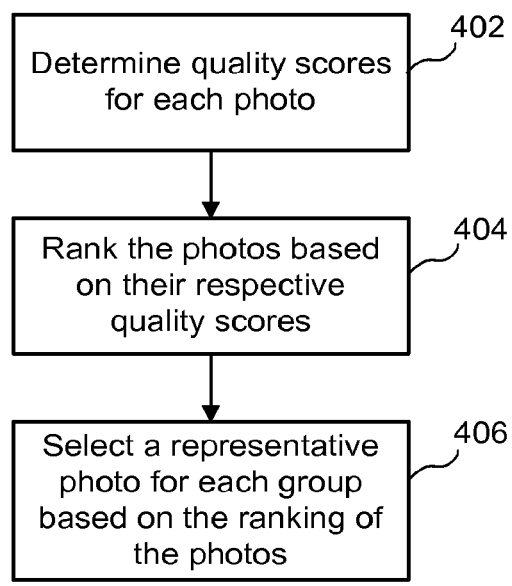
FIG. 4 illustrates an example simplified flow diagram for selecting representative photos that summarize a photo album in a social network system, according to one embodiment.

FIG. 4 illustrates an example simplified flow diagram for selecting representative photos that summarize a photo album in a social network system, according to one embodiment. Referring to both FIGS. 1 and 4, the method is initiated in block 402, where system 102 determines quality scores for each photo, where the quality score for a given photo is based on one or more attribute scores. In various embodiments, the attribute scores of a given photo are based on multiple attributes. For example, attributes may include faces of people, landmarks, cropping limitations, etc. As described in more detail below, by basing an overall quality score of each photo on various attribute scores, system 102 is able to select representative photos that have a high probability of being interesting, appealing, and that are best photos to represent various themes, people, location, places, and times the photos were taken.

In one embodiment, an attribute score may be based on facial attributes. In one embodiment, system 102 may detect one or more faces in a photo, and detect associated facial features. For example, such facial features may be indicative of emotions (e.g., smiling, frowning, etc.), eye and/or head direction, face size, gender, etc. System 102 may then assign a facial attribute score based on one or more policies. For example, in various embodiments, system 102 associate a higher facial attribute score with photos showing faces that have a higher probability of being appealing to a viewer. For example, system 102 may associate a higher score with photos showing faces showing more emotion, or happy emotions, etc. System 102 may associate a higher score with photos showing eyes and/or mouth that are open (e.g., where a person is smiling with eyes open). System 102 may associate a higher score with photos showing babies.

In one embodiment, an attribute score may be based on landmark attributes. In one embodiment, system 102 may detect one or more landmarks in a photo, and detect associated landmark features. For example, such landmark features may be indicative of particular well-known landmarks (e.g., Times Square, Eiffel Tower, etc.). System 102 may then assign a landmark attribute score based on one or more policies. For example, in various embodiments, system 102 may associate a higher landmark attribute score with photos showing well-known and/or popular landmarks.

In one embodiment, an attribute score may be based on cropping attributes. In one embodiment, system 102 may detect one or more objects in a photo, and detect facial features, landmark features, or other features. System 102 may then compute image saliency masks for smart-cropping, where a saliency mask indicates whether or not an image can be cropped to a certain aspect ratio without a significant loss of content. For example, system 102 would not crop a particular to fit a required aspect ratio (e.g., an aspect ratio for a mobile phone screen) if the primary content (e.g., face, landmark, etc.) would be cropped. System 102 may assign a poor cropping attribute score based on one or more policies. For example, in various embodiments, system 102 may associate a higher poor cropping attribute score with photos with poor cropping capabilities. In one embodiment, the poor cropping attribute score is a negative number (e.g., a penalty score). When added to the over attribute scores, a higher poor cropping attribute score would lowers the overall quality of a given photo. Ultimately, system 102 would not select a particular photo to represent a group if the face or landmark would need to be cropped in order to comply with a particular aspect ratio requirement. In one embodiment, system 102 may prune or crops images to ensure that a given photo may be shown well when representing each group of photos.

While some example embodiments herein are described in the context of faces and landmarks, system 102 may also determine other attribute scores to be factored into an overall quality score. For example, system 102 may determine attribute scores for logos and other objects. In another example embodiment, system 102 may factor in attribute scores associated with non-visual signals such as text, geo-location, and social networking aspects (e.g., friends). For example, system 102 may give a higher attribute score to photos showing friends or family compared to photos showing people who are not friends or family.

In one embodiment, system 102 may also factor in whether a photo is associated with a particular type of event. For example, system 102 may give a higher attribute score to photos associated with a significant event (e.g., wedding, graduation ceremony, vacation, etc.).

In one embodiment, system 102 may also factor in repetition of photos showing a particular subject matter (e.g., person, landmark, logo, etc.). The high number of photos of repeating subject matter indicates high importance. For example, there may be many photos (e.g., 10 photos, 15 photos, etc.) of a newborn baby. The repetitive nature of the photos would contribute positively to a higher quality score. This is one example, and a similar embodiment may apply to objects of varying subject matter (e.g., landmarks, logos, themes, etc.).

In one embodiment, system 102 may also factor in other attribute scores associated with other visual quality aspects such as poor quality images, motion blur, poor exposure, closed eyes, etc. Some of these attribute scores may have negative values, because they reflect attributes that lower the quality of a given photo.

In one embodiment, system 102 may give particular weight to photos with features associated with machine learning or other regression techniques including model training based on human-labeled preferences. For example, system 102 may extract general-purpose image content features and compute a visual quality score based on these content features. In one embodiment, system 102 may calibrate various attribute scores based on signal vectors that contain multiple components (e.g., facial attribute score, landmark attribute score, landmark popularity, number of faces, number of duplicate photos, etc.), where the signal vectors are based on machine learning or other regression techniques.

Referring still to FIG. 4, in block 404, system 102 ranks the photos based on their respective quality scores. In one embodiment, system 102 may aggregate the photos to compare them against each other. System 102 then generates a global ranking of the photos based on their respective global/overall quality scores. In various embodiments, system 102 may select the highest ranking photos and then apply restrictions. For example, in one embodiment, system 102 may apply a packing constraint, where system 102 would not select the same subject matter twice (e.g., the same person, the same landmark, etc.).

In block 406, system 102 selects one or more representative photos for each group based on the ranking of the photos. In one embodiment, system 102 may select multiple representative photos for a given group. For example, in a given group there may be two people that warrant being in the same group, and a photo of each of the two people may both rank highly. System 102 may select both photos, one for each person, to represent the group. This is one example, and a similar embodiment may apply to objects of varying subject matter (e.g., landmarks, logos, themes, etc.).

In various embodiments, when applying a facial recognition algorithm, system 102 may obtain reference images of users of the social network system, where each reference image includes an image of a face that is associated with a known user. The user is known, in that system 102 has the user's identity information such as the user's name and other profile information. In one embodiment, a reference image may be, for example, a profile image that the user has uploaded. In one embodiment, a reference image may be based on a composite of a group of reference images.

In one embodiment, to recognize a face in a photo, system 102 may compare the face (i.e., image of the face) and match the face to reference images of users of the social network system. Note that the term "face" and the phrase "image of the face" are used interchangeably. For ease of illustration, the recognition of one face is described in some of the example embodiments described herein. These embodiments may also apply to each face of multiple faces to be recognized.

In one embodiment, system 102 may search reference images in order to identify any one or more reference images that are similar to the face in the photo.

In one embodiment, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In one embodiment, system 102 may use data gathered from the analysis to match the face in the photo to one more reference images with matching or similar features. In one embodiment, system 102 may normalize multiple reference images, and compress face data from those images into a composite representation having information (e.g., facial feature data), and then compare the face in the photo to the composite representation for facial recognition.

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of facial recognition algorithms to narrow the possibilities, ideally down to one best candidate.

For example, in one embodiment, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In one embodiment, system 102 may generate an output indicating a likelihood (or probability) that the face in the photo matches a given reference image. In one embodiment, the output may be represented as a metric (or numerical value) such as a percentage associated with the confidence that the face in the photo matches a given reference image. For example, a value of 1.0 may represent 100% confidence of a match. This could occur, for example when compared images are identical or nearly identical. The value could be lower, for example 0.5 when there is a 50% chance of a match. Other types of outputs are possible. For example, in one embodiment, the output may be a confidence score for matching.

For ease of illustration, the example embodiment described above has been described in the context of a facial recognition algorithm. Other similar recognition algorithms and/or visual search systems may be used to recognize objects such as landmarks, logos, entities, events, etc. in order to implement embodiments described herein.

Embodiments described herein provide various benefits. For example, the system provides representative photos for a photo album without requiring any user action. The representative photos include images of high quality and images that represent diverse groups of photos. Embodiments described herein also increase overall engagement among end-users in a social networking environment by providing a group identity or group messaging thread identity.

Figure 5:
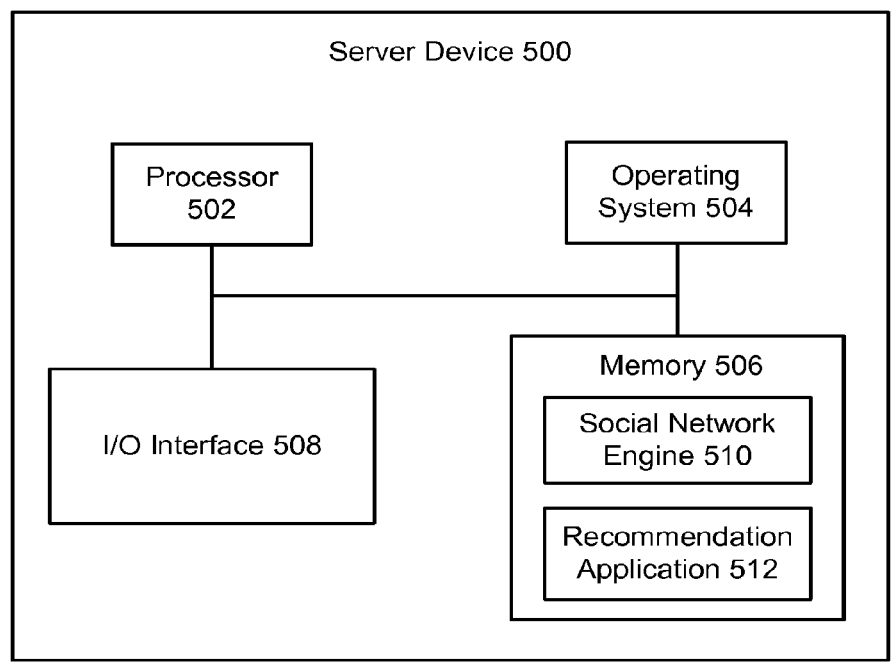
FIG. 5 illustrates a block diagram of an example server device, which may be used to implement the embodiments described herein.

FIG. 5 illustrates a block diagram of an example server device 500, which may be used to implement the embodiments described herein. For example, server device 500 may be used to implement server device 104 of FIG. 1, as well as to perform the method embodiments described herein. In one embodiment, server device 500 includes a processor 502, an operating system 504, a memory 506, and input/output (I/O) interface 508. Server device 500 also includes a social network engine 510 and a messaging application 512, which may be stored in memory 506 or on any other suitable storage location or computer-readable medium. Messaging application 512 provides instructions that enable processor 502 to perform the functions described herein and other functions.

For ease of illustration, FIG. 5 shows one block for each of processor 502, operating system 504, memory 506, social network engine 510, messaging application 512, and I/O interface 508. These blocks 502, 504, 506, 508, 510, and 512 may represent multiple processors, operating systems, memories, I/O interfaces, social network engines, and messaging applications. In other embodiments, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming language and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method to provide representative photos from a plurality of photos, the method comprising:
    Implementing, by one or more processors, in the following steps:
    grouping the plurality of photos into a plurality of groups of photos, wherein the grouping comprises:
    determining values of one or more similarity factors based on a comparison of a first photo of the plurality of photos and a second photo of the plurality of photos, wherein the values of the one or more similarity factors are based on one or more of: a visual distance between the first photo and the second photo, a length of time between capture of the first photo and capture of the second photo, and a difference between a first number of people in the first photo and a second number of people in the second photo;
    aggregating the values of the one or more similarity factors to obtain a total value;
    determining that the total value satisfies a predetermined threshold; and
    in response to determination that the total value satisfies the predetermined threshold, adding at least one of the first photo and the second photo into a particular group of the plurality of groups of photos;
    selecting a plurality of representative photos, wherein each representative photo represents a respective group from the plurality of groups of photos, wherein the plurality of representative photos are selected from two or more of the plurality of groups of photos based on a quality score associated with each of the plurality of photos; and
    providing the plurality of representative photos to a user.

2. The computer-implemented method of claim 1, further comprising:
    applying a packing constraint such that each representative photo of the plurality of representative photos includes subject matter different from other representative photos of the plurality of representative photos.

3. The computer-implemented method of claim 1, wherein determining the values for one or more similarity factors comprises:
    assigning a first value proportional to the visual distance to a first similarity factor of the one or more similarity factors.

4. The computer-implemented method of claim 3, wherein determining the values for one or more similarity factors comprises:
    assigning a second value proportional to the length of time to a second similarity factor of the one or more similarity factors.

5. The computer-implemented method of claim 3, wherein determining the values for one or more similarity factors comprises:
    assigning a third value proportional to the difference to a third similarity factor of the one or more similarity factors.

6. The computer-implemented method of claim 1, wherein aggregating the values of the one or more similarity factors to obtain the total value comprises assigning a weight to each of the one or more similarity factors.

7. The computer-implemented method of claim 1, wherein adding at least one of the first photo and the second photo into a particular group of the plurality of groups of photos comprises adding the first photo into the particular group that includes the second photo.

8. The computer-implemented method of claim 1, wherein the plurality of representative photos are selected such that each representative photo of the plurality of photos includes subject matter not included in other representative photos of the plurality of representative photos.

9. The computer-implemented method of claim 1, further comprising:
    merging a first group and a second group of the plurality of groups of photos based on similarity between photos in the first group and photos in the second group.

10. The computer-implemented method of claim 1, further comprising: determining that the photos in the first group and photos in the second group are dissimilar based on a length of time between photos in the first group and photos in the second group.

11. The computer-implemented method of claim 1, further comprising:
    determining one or more attribute scores based on signal vectors that contain multiple components, wherein each attribute score is associated with a different type of attribute; and
    determining the quality score based on the one or more attribute scores.

12. A non-transitory computer-readable medium with instructions stored thereon to provide representative photos from a plurality of photos, that when executed by a processor, cause the processor to:
   determine values of one or more similarity factors based on comparison of a first photo of the plurality of photos and a second photo of the plurality of photos, wherein the similarity factors are based on one or more of: a visual distance between the first photo and the second photo, a length of time between capture of the first photo and capture of the second photo, and a difference between a first number of people in the first photo and a second number of people in the second photo;
   aggregate the values of the one or more similarity factors to obtain a total value;
   determine that the total value satisfies a predetermined threshold;
   in response to determination that the total value satisfies the predetermined threshold, group the first photo and the second photo into a particular group of a plurality of groups of photos;
   select a plurality of representative photos, wherein each representative photo represents a respective group from the plurality of groups of photos, wherein the plurality of representative photos are selected from two or more of the plurality of groups of photos based on a quality score associated with each of the plurality of photos; and
   provide the plurality of representative photos to a user.

13. The non-transitory computer-readable medium of claim 12, with further instructions stored thereon that, when executed by the processor, cause the processor to:
   apply a packing constraint such that each representative photo of the plurality of representative photos includes subject matter different from other representative photos of the plurality of representative photos.

14. The non-transitory computer-readable medium of claim 12, wherein the instructions aggregate the values of the one or more similarity factors comprise instructions to assign a weight to each of the one or more similarity factors.

15. The non-transitory computer-readable medium of claim 12, wherein the instructions to group the first photo and the second photo into a particular group of a plurality of groups of photos comprise instructions to combine the first photo and the second photo into the particular group.

16. The non-transitory computer-readable medium of claim 12, with further instructions stored thereon that, when executed by the processor, cause the processor to:
   extract one or more image content features; and
   compute the quality score based on the one or more image content features.

17. The non-transitory computer-readable medium of claim 12, with further instructions stored thereon that, when executed by the processor, cause the processor to merge a first group and a second group of the plurality of groups of photos based on similarity between photos in the first group and photos in the second group.

18. The non-transitory computer-readable medium of claim 12, with further instructions stored thereon that, when executed by the processor, cause the processor to:
   determine one or more attribute scores based on signal vectors that contain multiple components, each attribute score associated with a different type of attribute; and
   determine the quality score based on the one or more attribute scores.

19. A system comprising a processor coupled to a memory, the memory including instructions stored thereon that, when executed by the processor cause the processor to:
   determine values of one or more similarity factors based on comparison of a first photo of the plurality of photos and a second photo of the plurality of photos, wherein the similarity factors are based on one or more of: a visual distance between the first photo and the second photo, a length of time between capture of the first photo and capture of the second photo, and a difference between a first number of people in the first photo and a second number of people in the second photo;
   aggregate the values of the one or more similarity factors to obtain a total value based on a respective weight assigned to each of the one or more similarity factors;
   determine that the total value satisfies a predetermined threshold;
   in response to determination that the total value satisfies the predetermined threshold, group the first photo and the second photo into a particular group of a plurality of groups of photos;
   select a plurality of representative photos, wherein each representative photo represents a respective group from the plurality of groups of photos, wherein the plurality of representative photos are selected from two or more of the plurality of groups of photos based on a quality score associated with each of the plurality of photos; and
   provide the plurality of representative photos to a user.

\* \* \* \* \*